Patented Dec. 7, 1937

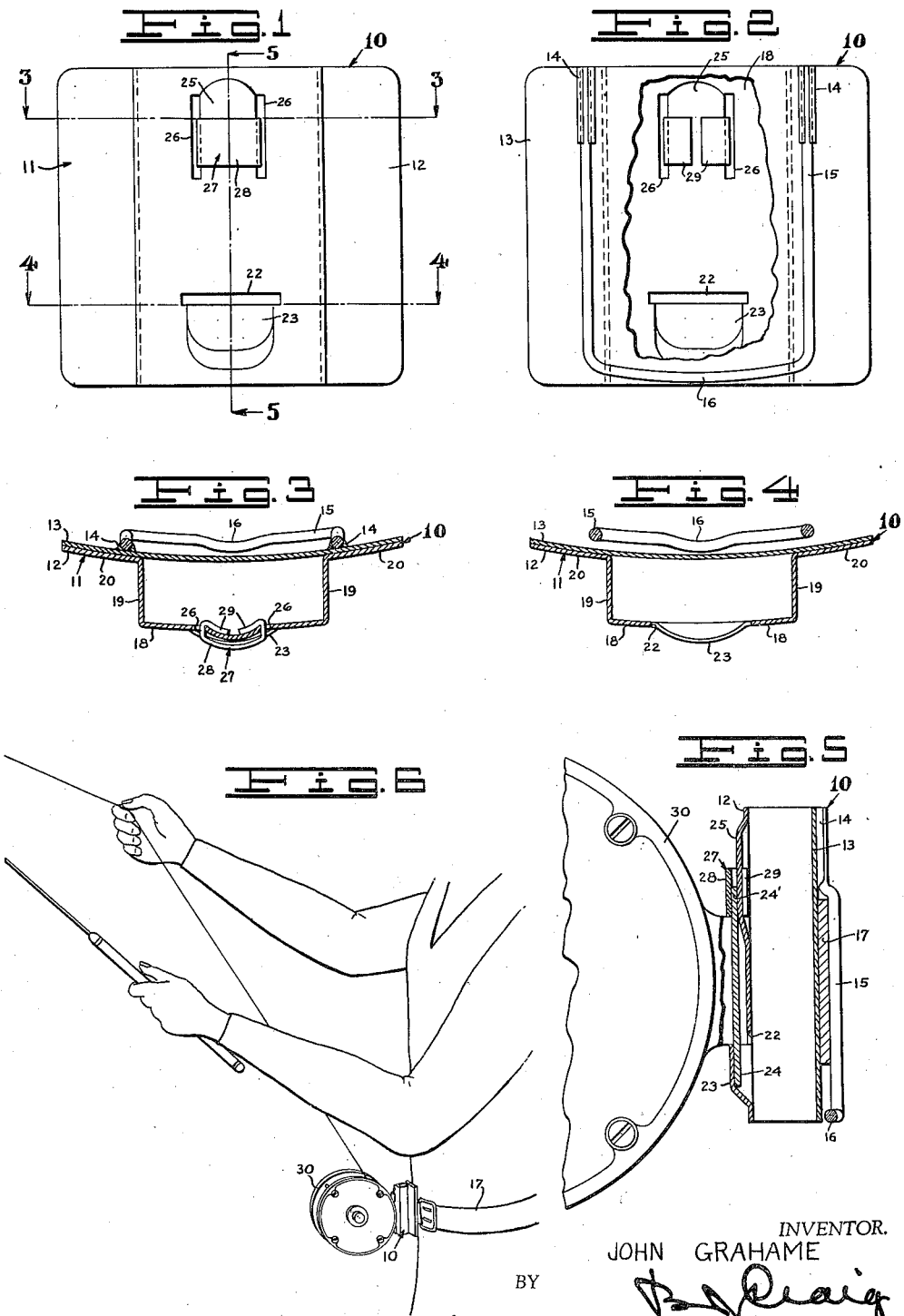

2,101,174

UNITED STATES PATENT OFFICE 2,101,174

SUPPORT FOR FISHING REELS

John Grahame, Sixes, Oreg.

Application October 9, 1936, Serial No. 104,834

2 Claims. (Cl. 224—5)

This invention relates to supports for fishing reels.

The general object of the invention is to provide a novel device for supporting a fishing reel.

An additional object of my invention is to provide a novel support for a reel which may be worn on a fisherman's belt.

A more specific object of the invention is to provide a novel support for a heavy fishing reel so that the latter may be supported on a fisherman's body and thus the balance of the fishing pole will not be disturbed.

An additional object of the invention is to provide a support for a reel which is large enough to provide room for the backing line necessary in landing large fish.

An additional object of the invention is to provide a support for a reel which because of its position on the operator's belt is out of the way and does not become tangled with the line.

Other objects and the advantages of my invention will be apparent from the following description taken in connection with the accompanying drawing, wherein:

Fig. 1 is a top plan view showing my improved fishing reel support;

Fig. 2 is a rear view of the support with parts broken away;

Fig. 3 is a section taken on line 3—3 of Fig. 1;

Fig. 4 is a section taken on line 4—4 of Fig. 1;

Fig. 5 is a section taken on line 5—5 of Fig. 1; and

Fig. 6 is a fragmentary side elevational view showing the support in use.

In the art of fly fishing the line is stripped from the reel with the free hand and usually several loops are stripped and are paid out by making false casts in the air. As these loops are taken up in the false casts other loops are stripped off while the false casting continues, then when the desired length of line has been paid out in the false casts the actual cast is made and if a fish strikes additional line is at once required in playing the fish. For instance, if sixty-five feet of line is out when a fish is hooked and the reel only carries one hundred feet of line then there is frequently not sufficient backing on the reel to allow the fish to be played properly. If more line is placed on a reel a larger reel is required and this becomes objectionable. Further, in this type of fishing the line frequently becomes wrapped about the reel in making the false casts and this is of course objectionable.

According to my invention I replace the reel with a counter balancing weight or other means so that the proper balance will be maintained in the fishing pole and mount the reel on a novel support which engages a belt carried by the fisherman. Then in stripping off line the stripping is done with the free hand from the belt. There is no reel on the pole to interfere and sufficient line can be carried on the reel so that there is plenty of backing no matter how large the fish hooked may be.

In the accompanying specification I have described one embodiment of my invention which overcomes the disadvantages set forth above and which also has advantages not present in the present type of fishing equipment.

Referring to the drawing by reference characters I have indicated my improved fishing reel support generally at 10. As shown the support 10 includes a body 11 which may be made of metal or any other suitable material. The body 11 consists of a front portion 12 and a back portion 13. As shown in Figs. 3 and 4 the back portion is slightly curved to better fit the wearer's body.

Secured to the back 13 by solder as at 14 I provide a U-shaped attaching member 15 which may be made of spring wire or other suitable material. As shown the lower part of the attaching member is bent inwardly as at 16 to aid in holding the support on a belt 17.

The front portion 12 is outwardly bent to form a curved face 18, concentric with the back 13, sides 19, and flanges 20. The flanges 20 may be secured to the back 13 as by soldering or by any other suitable means.

On the face 18 I provide a slot 22 and an outwardly pressed lip 23 below the slot in which the lower end of the reel bracket 24 is secured. (See Fig. 5.)

On the upper part of the face 18 I provide an outwardly pressed boss 25. A slot 26 is arranged at each side of the boss 25 and slidably mounted in the slots 26 I show a slide 27 which holds the upper end of the reel bracket 24' in place. As shown the slide 27 includes a curved front portion 28 and rear flanges 29.

In operation, the attaching member 15 is slipped over the fisherman's belt 17 where it is held in place. The lower reel bracket 24 is then inserted in the slot 22 so that it engages behind the lip 23. The slide 27 is then forced downwardly on the upper bracket 24' and the reel 30 is securely held on the support 10.

In use after the reel has been mounted on the support the first false casts are made and the loops are drawn off from the reel as desired, then after the real cast is made and a fish hooked, in playing the fish the line is unwound from the reel on the belt and the pole is given the necessary movement to control the fish.

From the foregoing description it will be apparent that I have invented a novel support for a fishing reel which can be economically manufactured and which is highly efficient in use.

Having thus described my invention I claim:

1. A reel support including a body, said body comprising a back portion and a front portion, said back portion being slightly curved to conform to the body of the wearer, a U-shaped resilient attaching clip having parallel ends secured to said back, the portion of said clip beyond the ends being spaced from the back, said front portion including an intermediate central portion which is curved concentric with the back and is spaced therefrom, said central portion having substantially parallel sides directed towards the back, said sides having end flanges thereon, said end flanges being in direct engagement with the back and secured thereto, the corner of said back and the end flanges being coextensive and curved and with the end flanges secured throughout to the back portion to provide a rigid portion of double thickness, said front face having a slot therein adjacent the bottom thereof, the wall of said front face below the slot being outwardly curved to provide a pocket adapted for the reception of the lower end of a fishing reel bracket, said front portion having a pair of spaced slots vertically extending and disposed adjacent the upper part thereof, an outwardly pressed portion arranged between said spaced slots, said outwardly pressed portion being in line with said pocket, a slide comprising a metal strip having its ends passing through said slots and bent towards each other with the bent ends disposed between the central portion and the back, said slide including a curved front portion adapted to engage the upper bracket on a fishing reel.

2. A reel support including a body, said body comprising a front portion and a back portion adapted to conform to the body of the wearer, a U-shaped attaching clip secured to said back, the portion of said clip beyond the ends being spaced from the back, said front portion including an intermediate central portion which is spaced therefrom, said central portion having sides directed towards the back, said sides having end flanges thereon, said end flanges being in direct engagement with the back and secured thereto, the corner of said back and the end flanges being coextensive and with the end flanges secured throughout to the back portion to provide a rigid portion of double thickness, said front face having a slot therein adjacent the bottom thereof, the wall of said front face below the slot being outwardly curved to provide a pocket adapted for the reception of the lower end of a fishing reel bracket, said front portion having a pair of spaced slots vertically extending and disposed adjacent the upper part thereof, an outwardly pressed portion arranged between said spaced slots, said outwardly pressed portion being in line with said pocket, a slide comprising a metal strip having its ends passing through said slots and bent towards each other with the bent ends disposed between the central portion and the back, said slide including a curved front portion adapted to engage the upper bracket on a fishing reel.

JOHN GRAHAME.